(No Model.)

S. L. ALLEN.
CULTIVATOR TOOTH.

No. 463,612. Patented Nov. 24, 1891.

Witnesses
Albert E. Leach
E. H. Gilman

Inventor
Samuel L. Allen
by W. B. H. Dowe
Atty.

UNITED STATES PATENT OFFICE.

SAMUEL L. ALLEN, OF CINNAMINSON, NEW JERSEY.

CULTIVATOR-TOOTH.

SPECIFICATION forming part of Letters Patent No. 463,612, dated November 24, 1891.

Application filed May 5, 1891. Serial No. 391,605. (No model.)

*To all whom it may concern:*

Be it known that I, SAMUEL L. ALLEN, a citizen of the United States, residing at Cinnaminson, in the county of Burlington and State of New Jersey, have invented certain new and useful Improvements in Cultivator-Teeth, of which the following is a full specification.

My invention consists of a certain improved cultivator-tooth for both horse and hand cultivators, which by reason of its peculiar shape and construction is particularly effective where almost perfectly level culture of the soil is required.

My object is to have the standard of the tooth shielded, so that it is not in the way of the passing earth as the implement moves over the ground, and, furthermore, to keep the earth from falling upon the plants after it is raised, thus enabling the operator to work very closely to the plants. I accomplish these results in the manner hereinafter described in detail.

Figure 1:
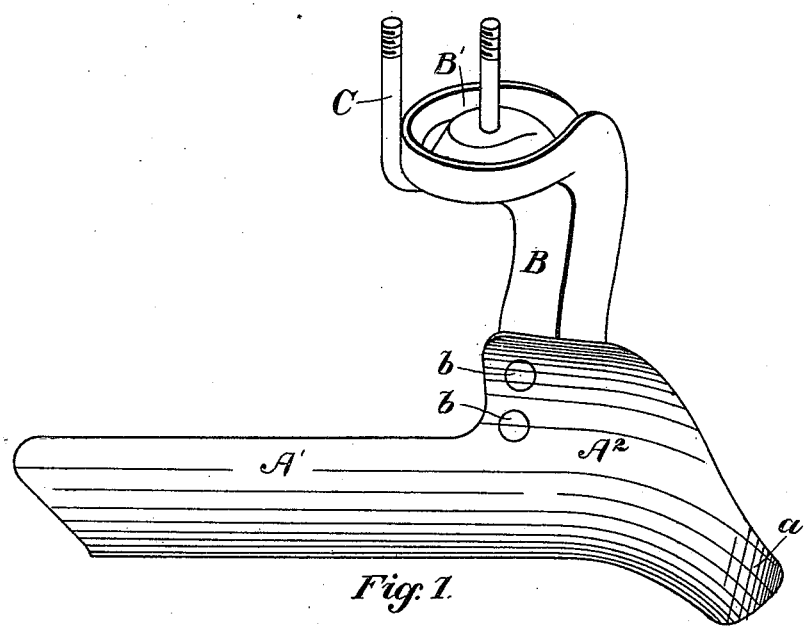
Figure 3:
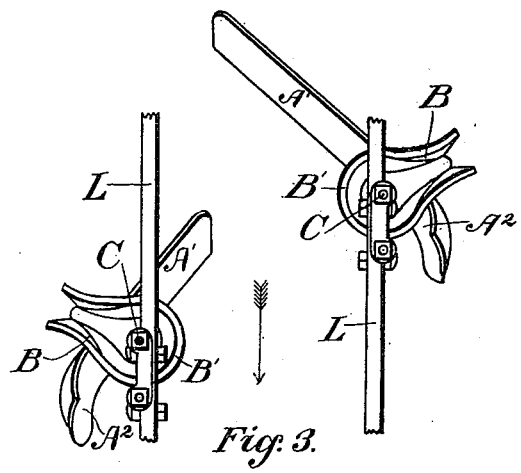
Figure 2:
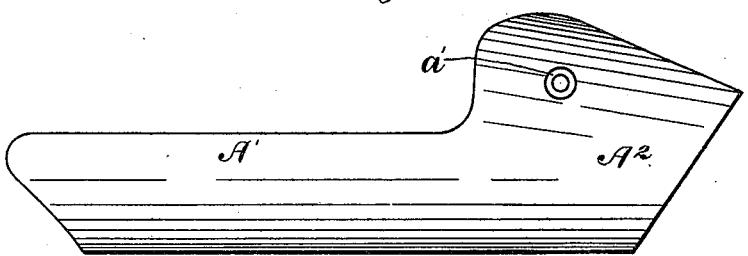

Referring to the accompanying drawings, Figure 1 shows in perspective one form of my improved tooth secured to its standard. Fig. 2 shows in front elevation a modified form of tooth detached, and Fig. 3 is a plan view showing the relative position of a pair of teeth when secured in place to a cultivator-frame.

The blade of the tooth consists of the shield or standard-protecting portion $A^2$, being the part to which the standard is secured, and the flat-arm extension or sweep $A'$, the whole being struck up, preferably, from a single piece of metal, although the blade may be straight and of steel, while the shield may be cast integral with the standard, or the whole tooth may be of cast metal.

The shield $A^2$ is preferably provided with the tapered hole or holes $a'$ near the inner edge thereof, into which holes fit the heads of the fastening bolts or rivets $b$, by which the blade is secured to the standard B, preferably in such a manner that the bolt-head is flush with the working surface of the tooth.

The form of tooth shown in Fig. 1 is, moreover, provided with the plow-point $a$, which in the position in which the tooth is preferably set is the foremost point thereof. This plow-point is bent over slightly so as to be set level, and its purpose is to cause the tooth to more readily enter the ground, it being oftentimes a matter of considerable difficulty to make a tooth of this kind enter the ground, especially when the soil is hard. This plow-point is, however, not essential, especially in teeth for hand-cultivators, wherein the depth of cut is more accurately regulated by the wheels of the cultivator.

I have shown a modified form of tooth in Fig. 2, wherein there is the curved shield $A^2$ and the flat-arm extension $A'$, but no plow-point on said shield, this form of the tooth being especially adapted for hand-cultivators.

The teeth are made and generally used in pairs and preferably occupy the relative position shown in Fig. 3. The standard shown is so arranged that the tooth may be set at any position axially. The standard shown in Figs. 1 and 3 has the head thereof $B'$ notched on the under side, and is secured to the side bar L of the cultivator by means of the staple-bolt C, though the particular construction of the standard and its method of attachment to the implement forms no part of my present invention.

The two teeth forming a pair are oppositely shaped to form rights and lefts, but need not be symmetrically opposite. As shown in Fig. 3, one of the flat-arm extensions $A'$ is much longer than the other, and the tooth is made of varying lengths to cut the exact width required.

When set in the proper position on the cultivator-frame, with the blades substantially at right angles to each other, as in Fig. 3, the shape of each tooth is such that as the cultivator moves along in the direction of the arrow the lower part of the standard B passes through the ground under cover of the shield $A^2$, so that the earth does not come in contact with and is not cut or disturbed by the said standard, even when the blade sinks quite deeply into the soil. Yet the shield is so shaped that it does not elevate and turn over the furrow so much but that it falls back just about where it came from, leaving the ground thoroughly broken up and the weeds cut off, but all practically level. The curve of the shield $A^2$ is such, moreover, as to keep the earth from falling on the plants even when passing very closely thereto.

I claim—

1. A cultivator-tooth consisting of a broad curved standard and plant-protecting shield A² and a narrow flat-arm extension A' integral therewith, substantially as and for the purposes described.

2. A cultivator-tooth provided with an angularly-adjustable standard and having a blade consisting of a broad curved protecting-shield secured to said standard, and a narrow flat-arm extension integral with said shield so constructed that when a pair of said teeth oppositely formed are secured to the cultivator-frame with the flat-arm extensions substantially at right angles to each other the shields serve to protect the crop from the falling earth while making room for the standard to pass, substantially as described.

3. A cultivator-tooth consisting of a curved plant and standard protecting-shield A², having at its foremost end a plow-point $a$, and a flat-arm extension A' integral with said shield, substantially as described.

In witness whereof I have hereunto set my hand.

SAMUEL L. ALLEN.

Witnesses:
JOHN C. ALLEN, Jr.,
WM. H. ROBERTS.